US012455236B2

(12) United States Patent
Fohtung

(10) Patent No.: US 12,455,236 B2
(45) Date of Patent: Oct. 28, 2025

(54) POLARIMETRIC COHERENT DIFFRACTION IMAGING

(71) Applicant: Rensselaer Polytechnic Institute, Troy, NY (US)

(72) Inventor: Edwin Fohtung, Niskayuna, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 275 days.

(21) Appl. No.: 18/109,525

(22) Filed: Feb. 14, 2023

(65) Prior Publication Data

US 2023/0258560 A1 Aug. 17, 2023

Related U.S. Application Data

(60) Provisional application No. 63/310,290, filed on Feb. 15, 2022.

(51) Int. Cl.
*G01N 21/47* (2006.01)
*G01N 23/2055* (2018.01)

(52) U.S. Cl.
CPC ..... *G01N 21/4788* (2013.01); *G01N 23/2055* (2013.01); *G01N 2201/06113* (2013.01); *G01N 2223/401* (2013.01)

(58) Field of Classification Search
CPC ............... G01N 21/4788; G01N 21/21; G01N 33/4833; G01N 15/1434; G01N 15/1429;
(Continued)

(56) References Cited

U.S. PATENT DOCUMENTS 5,534,360 A * 7/1996 Gambino .......... G11B 11/10586
420/3
5,788,632 A * 8/1998 Pezzaniti ........... A61B 5/14558
600/316
(Continued)

FOREIGN PATENT DOCUMENTS

EP 0190628 A2 8/1986

OTHER PUBLICATIONS

Anwar, S., et al., "Optical diagnostic of breast cancer using Raman, polarimetric and fluorescence spectroscopy," Laser Physics Letters, vol. 12, pp. 1-6, Feb. 2015.

*Primary Examiner* — Sang H Nguyen
(74) *Attorney, Agent, or Firm* — Barclay Damon LLP; Anthony P. Gangemi

(57) ABSTRACT

In one embodiment, there is provided method of imaging a biological sample. The method includes providing, by a polarizing source assembly, a source polarized coherent electromagnetic beam to the biological sample. The method further includes capturing, by a detector assembly, an intermediate electromagnetic beam from the biological sample. The intermediate electromagnetic beam is related to the source polarized coherent electromagnetic beam and to an optical anisotropic property of the biological sample. The method further includes providing, by the detector assembly, an output electrical signal corresponding to an output electromagnetic beam. The output electromagnetic beam is related to the intermediate electromagnetic beam. The method further includes generating, by an imaging circuitry, an image of at least a portion of the biological sample based, at least in part, on the output electrical signal.

18 Claims, 6 Drawing Sheets

(58) Field of Classification Search
CPC .......... G01N 15/0227; G01N 15/1433; G01N 15/01; G01N 23/2055; G01N 23/20; G01N 2223/401; G01N 2223/1016; G01N 2223/612; G01N 2223/345; G01N 2015/144; G01N 2015/1493; G01N 2015/0038; G01N 2015/1006; G01N 2201/06113

See application file for complete search history.

(56) References Cited

U.S. PATENT DOCUMENTS

| | | | |
|---|---|---|---|
| 6,317,209 B1 * | 11/2001 | Priestley | G01J 4/00 356/426 |
| 6,927,888 B2 | 8/2005 | Garcia et al. | |
| 7,312,869 B2 * | 12/2007 | Wang | G01N 21/23 356/365 |
| 7,420,675 B2 | 9/2008 | Giakos | |
| 7,718,326 B2 | 5/2010 | Stenger | |
| 8,462,824 B2 | 6/2013 | Popmintchev et al. | |
| 9,513,276 B2 | 12/2016 | Tearney et al. | |
| 9,891,584 B2 | 2/2018 | Zhang et al. | |
| 9,892,812 B2 | 2/2018 | Zheng et al. | |
| 9,911,207 B2 | 3/2018 | Karl et al. | |
| 9,970,891 B2 | 5/2018 | Dudovich et al. | |
| 10,073,025 B2 | 9/2018 | Bartels et al. | |
| 10,088,762 B2 | 10/2018 | Witte et al. | |
| 10,162,161 B2 | 12/2018 | Horstmeyer et al. | |
| 10,419,665 B2 | 9/2019 | Ou et al. | |
| 10,684,458 B2 | 6/2020 | Chung et al. | |
| 10,732,396 B2 | 8/2020 | Kim et al. | |
| 2005/0094144 A1 * | 5/2005 | Gibbs | G01N 21/21 356/365 |
| 2009/0323064 A1 * | 12/2009 | Wang | G01M 11/0285 356/365 |
| 2011/0085163 A1 * | 4/2011 | Shin | G01N 21/21 356/300 |
| 2014/0247045 A1 * | 9/2014 | Kornack | G01R 33/26 324/304 |
| 2023/0124259 A1 * | 4/2023 | Mehta | G02B 21/0092 356/364 |

* cited by examiner

POLARIMETRIC COHERENT DIFFRACTION IMAGING

CROSS REFERENCE TO RELATED APPLICATION(S)

This application claims the benefit of U.S. Provisional Application No. 63/310,290, filed Feb. 15, 2022, which is incorporated by reference as if disclosed herein in its entirety.

FIELD

The present disclosure relates to polarimetric coherent diffraction imaging, in particular to, polarimetric coherent diffraction imaging on cancerous cells and SARS-CoV-2 viruses.

BACKGROUND

Simultaneously non-destructive, high resolution, and label-free imaging is useful for studies of biological systems of differing complexity, from viruses to cell cultures. Electron imaging techniques can achieve very high resolution, but rely on slicing a sample to obtain volumetric information. X-rays' relatively high penetrative ability combined with cryogenic temperatures allow access to high resolution while preserving the sample's structure. Both X-ray and electron techniques may rely on labels to support imaging with tissue specificity.

SUMMARY

In some embodiments, there is provided method of imaging a biological sample. The method includes providing, by a polarizing source assembly, a source polarized coherent electromagnetic beam to the biological sample. The method further includes capturing, by a detector assembly, an intermediate electromagnetic beam from the biological sample. The intermediate electromagnetic beam is related to the source polarized coherent electromagnetic beam and to an optical anisotropic property of the biological sample. The method further includes providing, by the detector assembly, an output electrical signal corresponding to an output electromagnetic beam. The output electromagnetic beam is related to the intermediate electromagnetic beam. The method further includes generating, by an imaging circuitry, an image of at least a portion of the biological sample based, at least in part, on the output electrical signal.

In some embodiments, the method includes generating, by an electromagnetic source, a source coherent electromagnetic beam; and polarizing, by a polarizer, the source coherent electromagnetic beam to yield the source polarized coherent electromagnetic beam.

In some embodiments, the method includes filtering, by a crystal analyzer, the intermediate electromagnetic beam to yield the output electromagnetic beam, and converting, by a detector, the output electromagnetic beam into the output electrical signal.

In some embodiments of the method, a frequency of the source polarized coherent electromagnetic beam corresponds to visible light or x-ray radiation.

In some embodiments of the method, a wavelength of the source polarized coherent electromagnetic beam is selected based, at least in part, on a characteristic of the biological sample.

In some embodiments of the method, the biological sample includes at least one of a cancerous cell and/or a virus cell.

In some embodiments of the method, a polarization of the source polarized coherent electromagnetic beam is selected from the group including vertical, horizontal, right-hand circular, left-hand circular, and/or elliptical.

In some embodiments of the method, a polarization of the crystal analyzer is selected from the group including vertical, horizontal, right-hand circular, left-hand circular, and/or elliptical.

In some embodiments of the method, the image corresponds to a map of an anisotropy in a complex refractive index of a cellular structure of the biological sample.

In some embodiments of the method, the characteristic of the biological sample corresponds to a range of a dimension of the selected cellular structure.

In some embodiments, there is provided a system for imaging a biological sample. The system includes a polarizing source assembly, a detector assembly, and an imaging circuitry.

The polarizing source assembly is configured to provide a source polarized coherent electromagnetic beam to the biological sample. The detector assembly is configured to capture an intermediate electromagnetic beam from the biological sample. The intermediate electromagnetic beam is related to the source polarized coherent electromagnetic beam and to an optical anisotropic property of the biological sample. The detector assembly is further configured to provide an output electrical signal corresponding to an output electromagnetic beam. The output electromagnetic beam is related to the intermediate electromagnetic beam. The imaging circuitry is configured to generate an image of at least a portion of the biological sample based, at least in part, on the output electrical signal.

In some embodiments of the system, the polarizing source assembly includes an electromagnetic source, and a polarizer. The electromagnetic source is configured to generate a source coherent electromagnetic beam. The polarizer is configured to polarize the source coherent electromagnetic beam to yield the source polarized coherent electromagnetic beam.

In some embodiments of the system, the detector assembly includes a crystal analyzer, and a detector. The crystal analyzer is configured to filter the intermediate electromagnetic beam to yield the output electromagnetic beam. The detector is configured to convert the output electromagnetic beam into the output electrical signal.

In some embodiments of the system, a frequency of the source polarized coherent electromagnetic beam corresponds to visible light or x-ray radiation.

In some embodiments of the system, a wavelength of the source polarized coherent electromagnetic beam is selected based, at least in part, on a characteristic of the biological sample.

In some embodiments of the system, the biological sample includes at least one of a cancerous cell and/or a virus cell.

In some embodiments of the system, a polarization of the source polarized coherent electromagnetic beam is selected from the group including vertical, horizontal, right-hand circular, left-hand circular, and/or elliptical.

In some embodiments of the system, a polarization of the crystal analyzer is selected from the group including vertical, horizontal, right-hand circular, left-hand circular, and/or elliptical.

In some embodiments of the system, the image corresponds to a map of an anisotropy in a complex refractive index of a cellular structure of the biological sample.

In some embodiments of the system, the characteristic of the biological sample corresponds to a range of a dimension of the selected cellular structure.

BRIEF DESCRIPTION OF DRAWINGS

The drawings show embodiments of the disclosed subject matter for the purpose of illustrating features and advantages of the disclosed subject matter. However, it should be understood that the present application is not limited to the precise arrangements and instrumentalities shown in the drawings, wherein.

Figure 1:
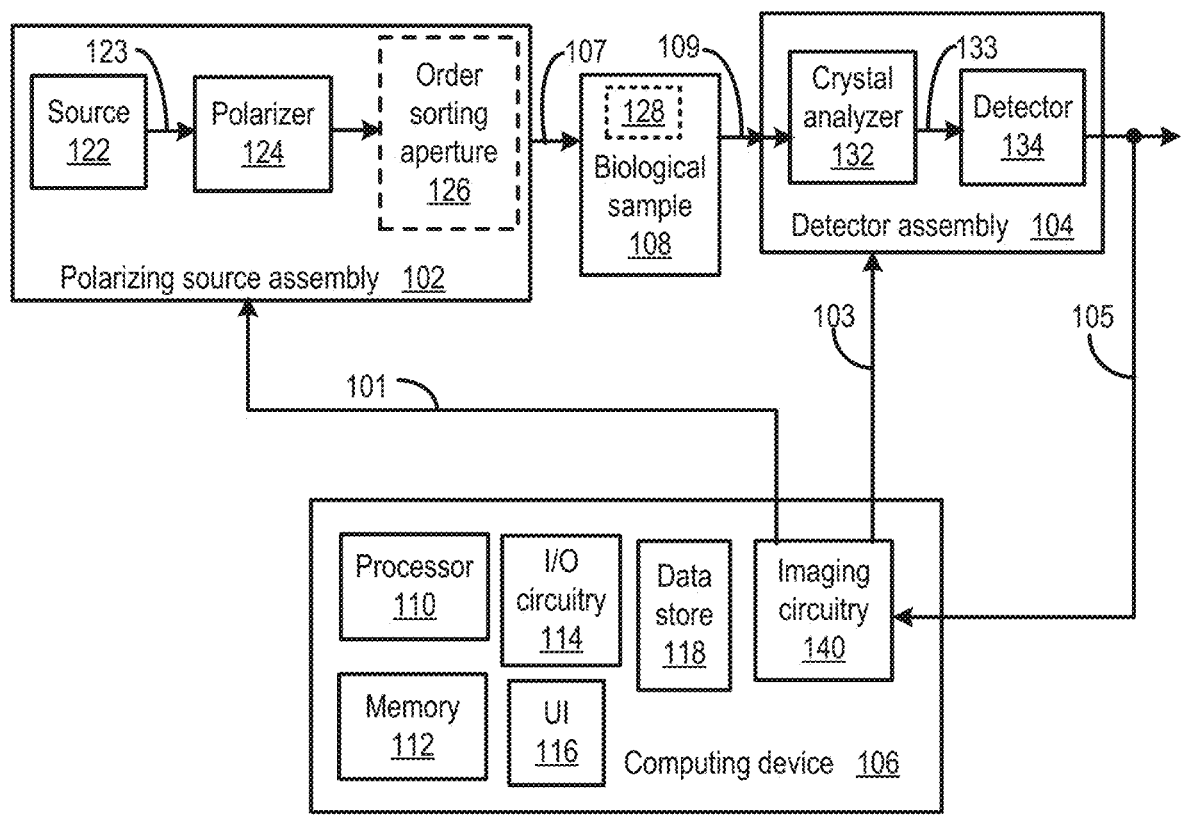
FIG. 1 illustrates a functional block diagram of a system for polarimetric coherent diffraction imaging, according to several embodiments of the present disclosure.

Although the following Detailed Description will proceed with reference being made to illustrative embodiments, many alternatives, modifications, and variations thereof will be apparent to those skilled in the art.

DETAILED DESCRIPTION

Generally, this disclosure relates to polarimetric coherent diffraction imaging of a biological sample that may include cancerous cells and/or SARS-CoV-2 (Severe Acute Respirator Syndrome Coronavirus 2) viruses. As is known, SARS-CoV-2 is a strain of coronavirus that causes coronavirus disease 2019 (COVID-19)). A method, apparatus and/or system may be configured to combine polarization of a source electromagnetic beam with coherent diffraction imaging ("polarimetric CDI") to implement non-destructive, relatively high resolution label-free imaging of the biological sample. The method, apparatus, and/or system is configured to use polarimetric CDI to map variations of anisotropy in a complex refractive index of cellular structure(s) included in the biological tissue sample to differentiate between various tissues without chemical labeling.

Combining a polarimetric approach with coherent diffractive imaging may allow differentiation between various tissues (i.e., tissue specificity) without labeling by mapping variations of anisotropy in a complex refractive index of cellular structures. In one nonlimiting example, cancerous cells may be imaged using birefringent coherent diffractive imaging using a laboratory visible light laser source. Experimental results suggest an enhanced sensitivity to fibrous structures and their orientation as well as a possibility to differentiate a nucleus of a cell, and show good agreement with a model. In another example, using simulation, a soft X-ray experiment on virus particles was performed to investigate a potential extension of the method, apparatus and/or system to viruses. It is contemplated that polarimetric coherent diffraction imaging with coherent optical light and/or X-rays may positively impact the field of cellular imaging, including, for example, in discovery of micro/nanostructures that can aid SARS-CoV-2 vaccine developments and treatment for seriously-ill COVID-19 patients.

As is known, members of the family of Coronaviridae are enveloped viruses, 80-220 nm (nanometers) in size, pleomorphic although often spherical (coronaviruses), or 120-140 nm in size and disc, kidney, or rod-shaped (toroviruses and bafiniviruses). SARS-CoV-2 is an enveloped virus of approximately 0.1 μm (micrometer) in diameter. Both SARS-CoV-2 viruses and cancerous cells are highly-anisotropic in their structures. Polarimetric CDI may be configured to retrieve polarization-dependent structural anisotropies. SARS-CoV-2 viruses are about 1000 times smaller than cancerous cells. X-rays may be used to reconstruct the complex nanostructures of SARS-CoV-2 viruses. Many synchrotron facilities can produce X-ray pulses of tens of pico-seconds long, and in many XFEL (X-ray free-electron laser) facilities, femto-second x-ray pulses are available for the pump-probe measurements. Understanding how a cell's structural anisotropy in the surrounding chemical environment alters when infected with SARS-CoV-2 viruses may be helpful for developing effective treatments. Polarimetric CDI at cryogenic temperatures can be implemented to minimize radiation damage caused by the high dose of X-rays produced by the XFEL pulses.

By way of theoretical background, X-ray imaging has been used to image biological specimens. In general, biological cellular structures are weakly-scattering objects. Their diffraction intensities are relatively low compared to hard condensed matter materials. The non-destructive nature of X-ray imaging preserves the native environments of the sample structures, while high-resolution electron microscopy sections the samples into thinner parts that might perturb the native state of the specimen. Radiation damage is a concern in X-ray imaging. It is known that hard X-rays imaging may result in relatively less damage due to the large penetration depth of into the specimen. The large penetration depth may then correspond to a relatively lower radiation damage per unit volume illuminated by the X-rays. In hard X-ray imaging, phase contrast is the main contrast mechanism in cellular imaging. In contrast to hard X-rays, soft X-ray imaging may benefit from a relatively high absorption contrast, including an ability to image with an X-ray energy near a carbon absorption edge (because most of the cellular structures are made of carbon). Accessibility of X-ray energies in a water window (from a K-edge of carbon at about 282 electron-volts (eV) to a K-edge of oxygen at about 533 eV) enables relatively higher contrast imaging of the specimen because of an enhanced carbon absorption contrast, and water is almost transparent.

Coherent diffraction imaging (CDI) is a lensless imaging technique that employs the coherence of electromagnetic radiation to generate constructive and destructive interference patterns in diffraction intensities. The coherent diffraction intensities may then be provided to an algorithm configured to iterate between real-space and reciprocal-space, resulting in solutions of corresponding real-space sample complex wave functions. Coherent intensities in reciprocal-space may be oversampled, thus satisfying an oversampling criterion. Generally, lens-based imaging methods depend on lithographic capabilities. CDI spatial resolution may be limited by diffraction without reliance on lithography. The 'phase problem' may be indirectly solved by the iterative algorithm. The iterative algorithm may be configured to use the measured diffraction intensities as the Fourier constraint, while a finite support is used as a real-space constraint that confines the electronic densities of the specimen in a defined region.

CDI may be configured to provide non-destructive relatively high-resolution phase-contrast imaging on various types of samples, including crystalline and amorphous structures. Additionally or alternatively, variants of the technique, including, but not limited to polarimetric CDI, may provide information on the anisotropy of the specimen's properties under investigation.

Ptychography, one nonlimiting example of CDI, combines scanning transmission X-ray microscopy (STXM) with CDI. Ptychography can be used to image extended objects with an unlimited field-of-view and simultaneously reconstruct the probe and the sample independently. Both CDI and ptychography can be implemented to image cancerous cells and the virus cellular structure of SARS-CoV-2 to better understand their intricate structural properties.

Generally, polarimetric CDI combines CDI and polarization (i.e., polarization of the photon states) to image specimens with polarization anisotropies. A respective difference in absorption constant for each birefringent/polarimetric material may generate a phase contrast in coherent diffraction patterns in orthogonal polarization directions. Anisotropy of properties, e.g., dielectric permittivity, of a birefringent/polarimetric specimen in the orthogonal directions, may induce contrast in exit wave function(s) of the tissue and corresponding coherent diffraction intensities. The coherent diffraction patterns may then be inverted to a corresponding real-space sample complex wave function. The real-space sample complex wave function is configured to encode the phase and/or absorption differences (i.e., differences in the refraction and/or the absorption parts of the complex refractive indices) in the birefringent/polarimetric specimen.

Thus, a system and/or method, according to the present disclosure, may be configured to provide an image that corresponds to a map of an anisotropy in a complex refractive index of the biological sample. The image may be acquired without relying on chemical labeling.

In one embodiment, there is provided method of imaging a biological sample. The method includes providing, by a polarizing source assembly, a source polarized coherent electromagnetic beam to the biological sample. The method further includes capturing, by a detector assembly, an intermediate electromagnetic beam from the biological sample. The intermediate electromagnetic beam is related to the source polarized coherent electromagnetic beam and to an optical anisotropic property of the biological sample. The method further includes providing, by the detector assembly, an output electrical signal corresponding to an output electromagnetic beam. The output electromagnetic beam is related to the intermediate electromagnetic beam. The method further includes generating, by an imaging circuitry, an image of at least a portion of the biological sample based, at least in part, on the output electrical signal.

FIG. 1 illustrates a functional block diagram of a system 100 for polarimetric coherent diffraction imaging, according to several embodiments of the present disclosure. System 100 includes a polarizing source assembly 102, a detector assembly 104, a computing device 106, and imaging circuitry 140. The imaging circuitry 140 may be coupled to or included in the computing device 106.

The polarimetric coherent diffraction imaging system 100 is configured to image a biological sample 108. The biological sample 108 may include, e.g., contain, one or more cellular structure(s) 128. The cellular structure(s) 128 may have dimensions on the order of micrometers (μm) and/or nanometers (nm). The cellular structure(s) 128 may include, but are not limited to, cancerous cells, and/or virus (e.g., coronavirus) cells. In one nonlimiting example, the coronavirus cells may include an SARS-CoV-2 virus. However, this disclosure is not limited in this regard.

In an embodiment, a characteristic of the biological sample 108 may correspond to a range of a dimension (e.g., a size parameter) of a selected cellular structure. For example, a coronavirus cell may have a dimension in the range of 80-220 nm. In another example, a torovirus cell and/or a bafinivirus cell may have a dimension in the range of 120-140 nm. In another example, a cancerous cell may have a dimension on the order of 1 nm.

Computing device 106 may include, but is not limited to, a computing system (e.g., a server, a workstation computer, a desktop computer, a laptop computer, a tablet computer, an ultraportable computer, an ultramobile computer, a netbook computer and/or a subnotebook computer, etc.), and/or a smart phone. Computing device 106 includes a processor 110, a memory 112, input/output (I/O) circuitry 114, a user interface (UI) 116, and data store 118.

Processor 110 is configured to perform operations associated with imaging circuitry 140. Memory 112 may be configured to store data associated with polarizing source assembly 102, detector assembly 104, and/or imaging circuitry 140. I/O circuitry 114 may be configured to provide wired and/or wireless communication functionality for system 100. For example, I/O circuitry 114 may be configured to provide a polarizer polarization selector signal 101 to polarizing source assembly 102, a crystal analyzer polarization selector signal 103 to detector assembly 104, and/or to receive a output electrical signal 105 from the detector assembly 104. UI 116 may include a user input device (e.g., keyboard, mouse, microphone, touch sensitive display, etc.) and/or a user output device, e.g., a display. Data store 118 may be configured to store data associated with one or more of polarizing source assembly 102, detector assembly 104, and/or imaging circuitry 140.

The polarizing source assembly 102 includes a source 122 and a polarizer 124, and may include an order sorting aperture 126. The polarizing source assembly 102 is configured to provide a source polarized coherent electromagnetic beam 107 to the biological sample 108. The source 122 corresponds to an electromagnetic source and is configured to generate a source coherent electromagnetic beam 123. In an embodiment, the source polarized coherent electromagnetic beam 123 may correspond to visible light. In another embodiment, the source polarized coherent electromagnetic beam 123 may correspond to x-ray radiation. In one nonlimiting example, the source 122 may correspond to a helium neon (HeNe) laser. However, this disclosure is not limited in this regard and the source 122 may correspond to a different source of visible light. In another example, the source 122 may correspond to a synchrotron. In another example, the source 122 may correspond to an x-ray free-electron laser. A type of source, e.g., visible light or x-ray, may be determined based, at least in part, on a selected wavelength of the source polarized coherent electromagnetic beam 107. The wavelength may be selected based, at least in part, on a characteristic of the biological sample 108, as described herein.

The polarizer 124 is configured to polarize the source coherent electromagnetic beam 123 to yield the source polarized coherent electromagnetic beam 107. A polarization applied to the source coherent electromagnetic beam 123 by the polarizer 124 may be selected based, at least in part, on a polarizer polarization selector signal 101 that may be received from, for example, imaging circuitry 140. The polarization (i.e., polarization direction) may include, but is not limited to, vertical, horizontal, right-hand circular, left-hand circular, and/or elliptical. Selecting elliptical polarization may include selecting a respective value for a major axis and a minor axis of a corresponding ellipse.

Thus, the polarizing source assembly 102 is configured to generate the source coherent electromagnetic beam 123, to apply a selected polarization to the source coherent electromagnetic beam, and to provide the source polarized coherent electromagnetic beam 107 to the biological sample 108. The source polarized coherent electromagnetic beam 107 may be scattered by the biological sample 108 and/or the cellular structure(s) 128 included in the biological sample 108. A corresponding intermediate electromagnetic beam 109 may then be output from the biological sample 108. The intermediate electromagnetic beam 109 is related to the source polarized coherent electromagnetic beam 107 and to an optical anisotropic property of the biological sample 108. The optical anisotropic property may correspond to a complex refractive index of the cellular structure 128. The biological sample 108 may thus be considered birefringent.

The detector assembly 104 is configured to capture the intermediate electromagnetic beam 109 from the biological sample 108. The detector assembly 104 includes a crystal analyzer 132, and a detector 134. The crystal analyzer 132 may be configured to filter the intermediate electromagnetic beam 109 to yield an output electromagnetic beam 133. The filtering may correspond to selectively passing a portion of the intermediate electromagnetic beam 109 having a selected polarization. The selected polarization passed by the crystal analyzer 132 may be selected based, at least in part, on a crystal analyzer polarization selector signal 103 that may be received from, for example, imaging circuitry 140. The polarization (i.e., polarization direction) may include, but is not limited to, vertical, horizontal, right-hand circular, left-hand circular, and/or elliptical. Selecting elliptical polarization may include selecting a respective value for a major axis and a minor axis of a corresponding ellipse.

The output electromagnetic beam 133 may then be provided to the detector 134. The detector 134 may be configured to convert the output electromagnetic beam 133 into a corresponding output electrical signal 105. In one nonlimiting example, the detector 134 may correspond to a charge coupled device (CCD). However, this disclosure is not limited in this regard. In other words, the detector 134 corresponds to a sensor configured to convert a received electromagnetic beam into a corresponding electrical signal whose corresponding image may then be displayed, e.g., on UI 116.

Thus, the detector assembly 104 is configured to receive the intermediate electromagnetic beam 109, to filter the intermediate electromagnetic beam 109 according to a selected polarization to yield the output electromagnetic beam 133, and to convert the output electromagnetic beam 133 into the corresponding output electrical signal 105. The corresponding output electrical signal 105 may then be provided to imaging circuitry 140.

Imaging circuitry 140 may then be configured to generate an image of at least a portion of the biological sample 108, e.g., a cellular structure, based, at least in part, on the output electrical signal 105. For example, the output electrical signal 105 may correspond to a plurality of coherent diffraction intensities and the imaging circuitry 140 may be configured to iterate between real-space and reciprocal-space to determine a solution of a real-space sample complex wave function, as described herein. It may be appreciated that the polarization of the source polarized coherent electromagnetic beam 107 may facilitate quantifying the anisotropy of the biological sample 108. The real-space image may then be displayed on, e.g., UI 116.

Thus, a system and/or method, according to the present disclosure, may be configured to provide an image that corresponds to a map of an anisotropy in a complex refractive index of the biological sample including one or more cellular structure(s). The image may be acquired without relying on chemical labeling.

Figure 2:
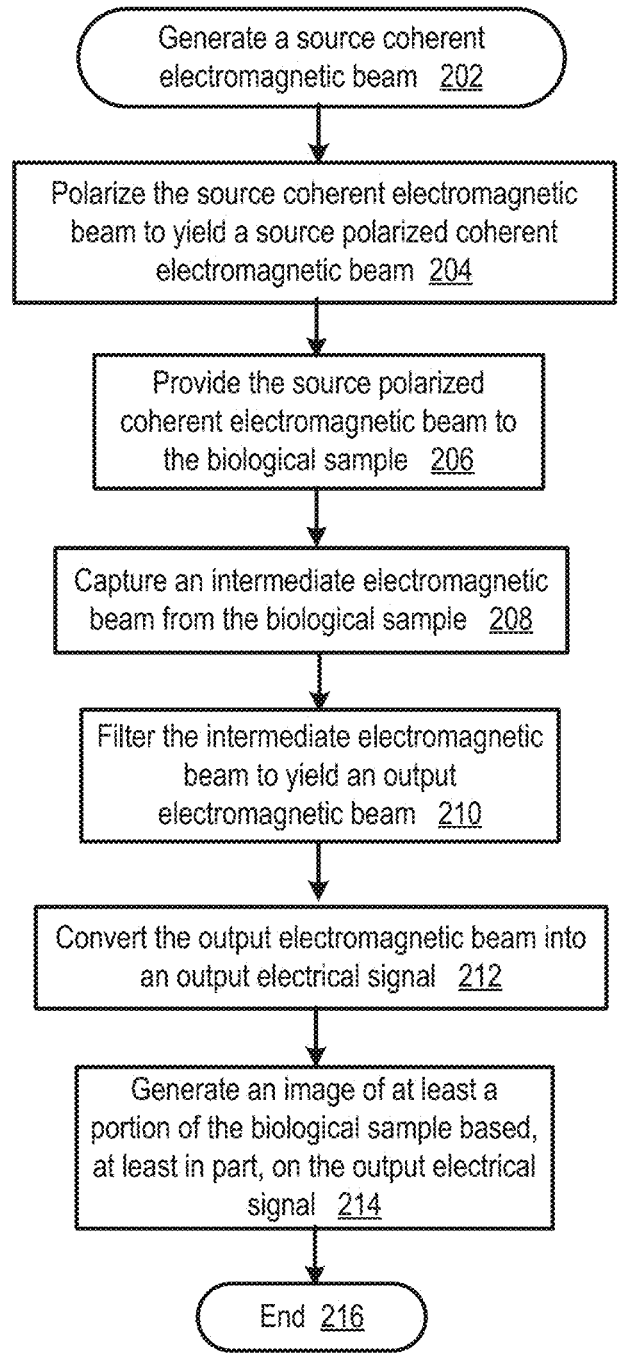
FIG. 2 is a flowchart of operations for polarimetric coherent diffraction imaging a biological sample, according to various embodiments of the present disclosure.

FIG. 2 is a flowchart 200 of operations for polarimetric coherent diffraction imaging a biological sample, according to various embodiments of the present disclosure. In particular, the flowchart 200 illustrates imaging a target biological sample and/or cellular structure(s) using polarimetric coherent diffraction imaging. The operations may be performed, for example, by the system 100 (e.g., polarizing source assembly 102, detector assembly 104, computing device 106, and/or imaging circuitry 140) of FIG. 1.

Operations of this embodiment may begin with generating a source coherent electromagnetic beam at operation 202. Operation 204 includes polarizing the source coherent electromagnetic beam to yield a source polarized coherent electromagnetic beam. The source polarized coherent electromagnetic beam may be provided to the biological sample at operation 206. An intermediate electromagnetic beam may be captured from the biological sample at operation 208. The intermediate electromagnetic beam is related to the source polarized coherent electromagnetic beam and to an optical anisotropic property of the biological sample. Operation 210 includes filtering the intermediate electromagnetic beam to yield an output electromagnetic beam. Operation 212 includes converting the output electromagnetic beam into an output electrical signal. The output electrical signal corresponds to the output electromagnetic beam. The output electromagnetic beam is related to the intermediate electromagnetic beam. An image of at least a portion of the biological sample may be generated based, at least in part, on the output electrical signal at operation 214. Flow may then end at operation 216.

Thus, a system and/or method, according to the present disclosure, may be configured to provide an image that corresponds to a map of an anisotropy in a complex refractive index of the biological sample including one or more cellular structure(s). The image may be acquired without relying on chemical labeling.

Experimental Data

Figure 3A:
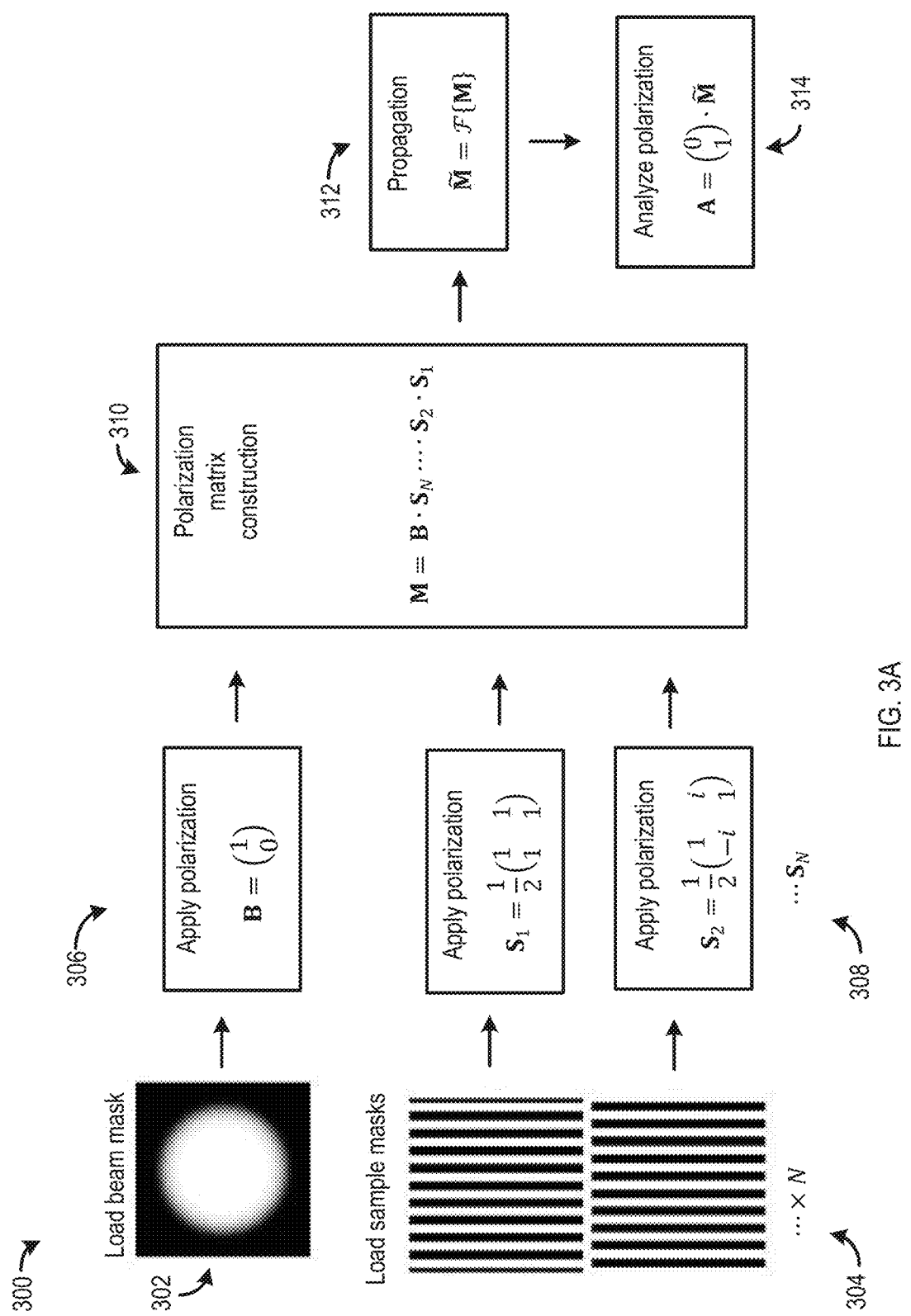
FIGS. 3A through 3D illustrate one example of simulated polarimetric coherent diffraction imaging.
Figure 3B:
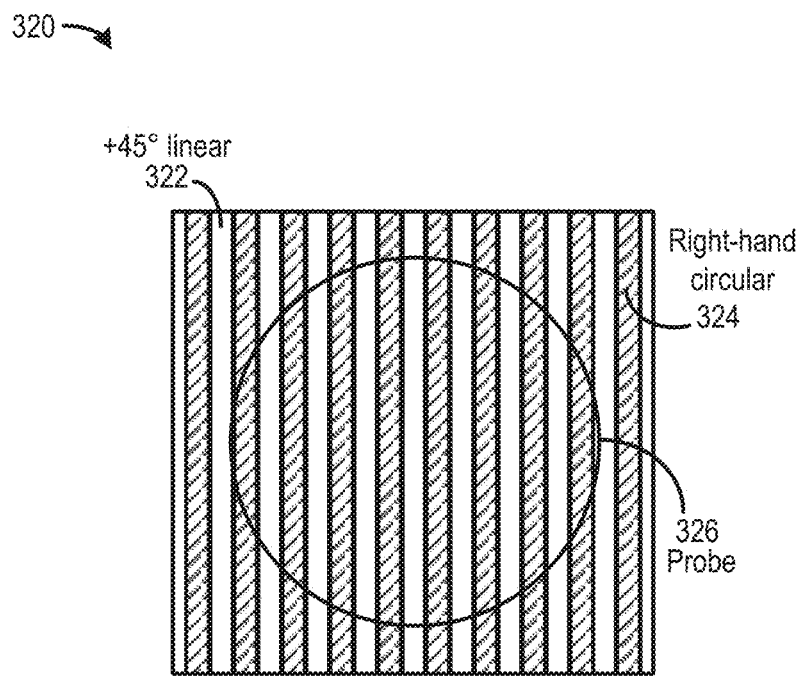
Figure 3C:
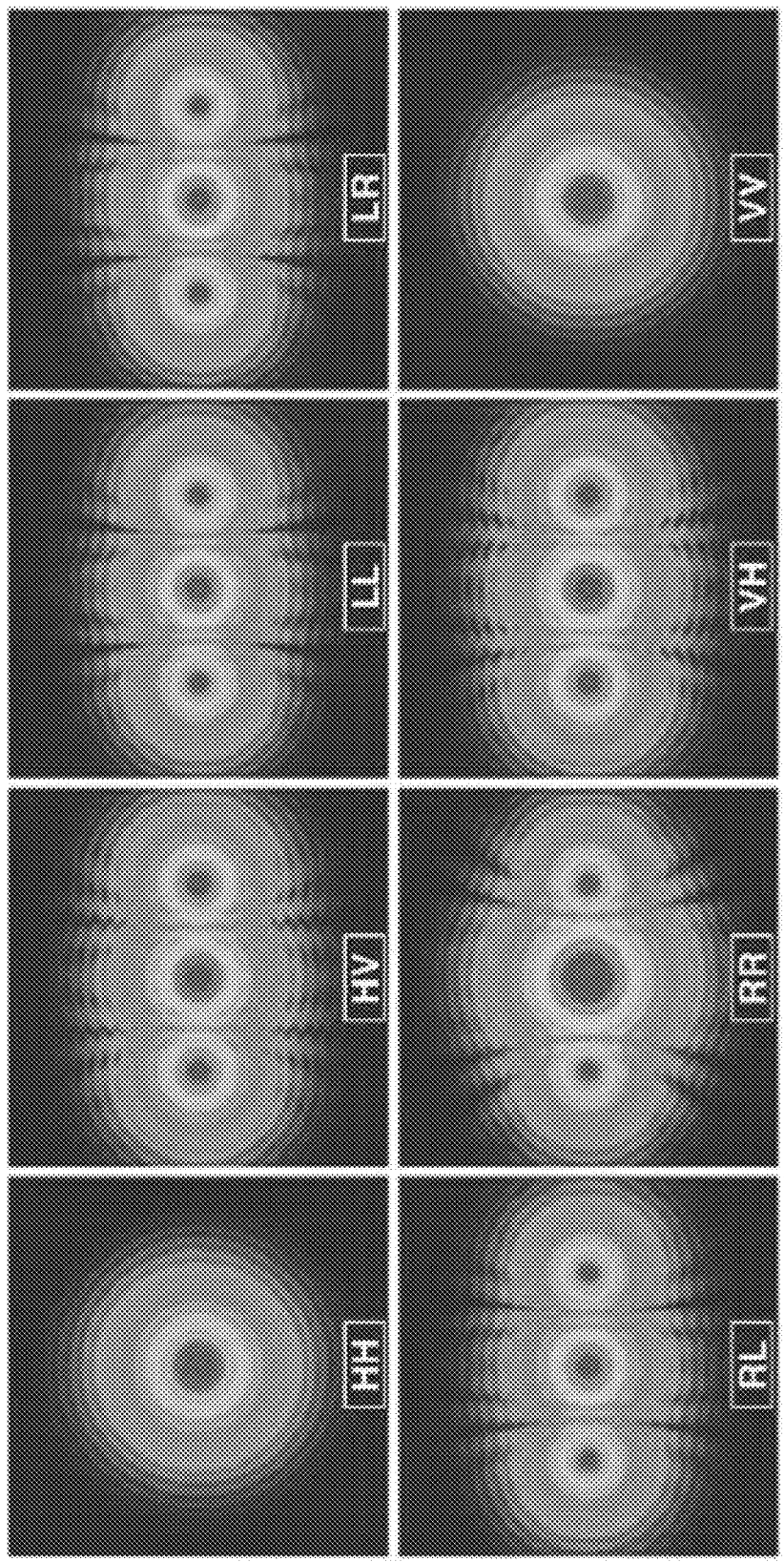
Figure 3D:
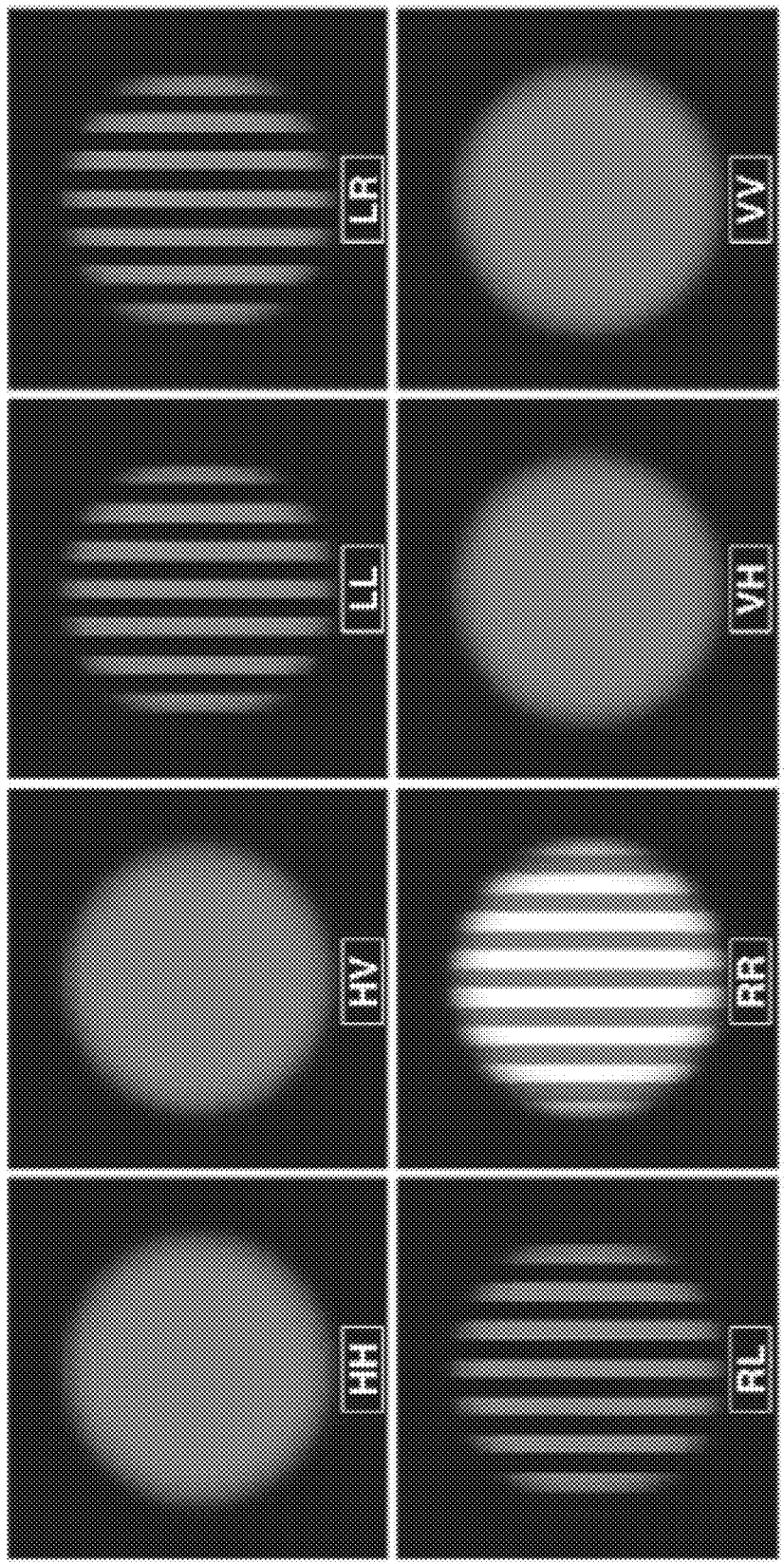

FIGS. 3A through 3D illustrate one example of simulated polarimetric coherent diffraction imaging. The simulated polarimetric coherent diffraction imaging is configured to illustrate modeling resulting diffraction patterns for systems with a variety of polarizer and analyzer settings, and to compare the resulting diffraction patterns with modeled real space images. FIGS. 3A through 3D may be best understood when considered together. FIG. 3A illustrates a simulation flow chart 300. FIG. 3B illustrates one example polarimetric test sample 320 used in the simulations. FIG. 3C illustrates coherent diffraction patterns 340 generated by various combinations of polarization state generator and polarization state analyzer for the polarimetric test sample 320 of FIG. 3B. FIG. 3D illustrates real space representations 360 of a combination of orthogonal linear polarizer and analyzer used in the simulations. In FIGS. 3C and 3D, the polarization states are: left hand circular (L), right hand circular (R), vertical (V), and horizontal (H). A polarization state generator polarization is listed first and a polarization state analyzer polarization is listed second. Thus, for example, "HV" corresponds to horizontal polarization of the polarization state generator and vertical polarization of the polarization state analyzer.

Turning now to FIG. 3A, simulation flow chart 300 includes loading a beam mask 302 and loading a number, N, sample masks 304. A polarized beam may be constructed by applying polarization, $$B = \begin{pmatrix} 1 \\ 0 \end{pmatrix},$$

combining the beam mask and a selected Jones vector 306 to form a corresponding beam vector. A sample matrix that includes the number N samples may be constructed from N sample masks, and combining each sample mask with a respective sample polarization matrix 308, e.g., $$S_1 = \frac{1}{2}\begin{pmatrix} 1 & 1 \\ 1 & 1 \end{pmatrix}, S_2 = \frac{1}{2}\begin{pmatrix} 1 & i \\ -i & 1 \end{pmatrix},$$

$S_N$. The sample matrix and the beam vector may then be combined to form the polarization matrix (M= B·$S_N$ ... $S_2$·$S_1$), i.e., an object 310. The object may then be propagated (e.g., $\tilde{M} = \mathcal{F}\{M\}$) to an analyzer plane 312. The propagated components of the polarization matrix may then be multiplied with a vector representation of the analyzer 314

$$A = \begin{pmatrix} 0 \\ 1 \end{pmatrix} \cdot \tilde{M},$$

and displayed as an intensity distribution.

Turning now to FIG. 3B, FIG. 3B illustrates one example polarimetric test sample 320 used in the simulations. The example polarimetric test sample 320 may correspond to a calibration model that includes a plurality of vertical stripes with alternating right-hand circular 324 and +45° linear 322 polarization, and a probe 326. According to the model, in real space, a combination of an orthogonal linear polarizer and an analyzer may not capture a presence of stripes (e.g., 360 of FIG. 3D). The presence of stripes may be indicated by corresponding diffraction patterns (e.g., 340 of FIG. 3C). It may be appreciated that this may suggest a possibility of extracting information on the optical anisotropy from a reconstruction of diffraction patterns.

In one nonlimiting example, polarimetric CDI experimental data were captured using a HeNe (helium-neon) laser source, with tools that enable a tunable polarization of the visible light generated by the laser source. The experimental setup further included a polarization state analyzer positioned between the sample and an area detector. The polarization state analyzer is configured to select, i.e., filter to pass, a diffraction intensity for a selected polarization direction. The experimental setup is one example of the polarimetric CDI system 100 of FIG. 1. The polarization state generator was capable of producing light with vertical, horizontal, right-hand circular, left-hand circular, and several elliptical polarization states. The polarization channels generated in the measurements are the ensemble of the full Jones vectors. Interesting contrast was produced in the birefringent-polarization channel CDI measurements, with fine features in the image of relatively high fidelity.

In another example, simulations were carried out with the polarimetric version of the cells system with a set of polarization channels of the electromagnetic illumination. It may be appreciated that model polarization-dependent cell amplitude structures included structures for 3 polarization channels. The vertical polarization, the +45° polarization, and right-hand circular polarization components had respective defined amplitude structures in simulation. The simulated coherent diffraction intensities of a set of combinations of the polarized illumination and the polarization-sensitive polarization state analyzers on the cell model were captured. The separate polarization channels' cell structures may be recovered from the coherent diffraction intensities by polarimetric CDI.

Results of the experiment with the cancerous cell were used to investigate the sensitivity of the method, as described herein, to viral particles to design a numerical simulation of the interaction between the virus-tissue interface and the polarized coherent X-ray radiation. The tissue-virus interface were numerically generated to have finer control over the model.

The tissue texture was generated using Perlin noise. The shape of the viral particles was procedurally generated starting with an elliptical shape with randomized semi-minor, semi-major axes and rotation. The ellipse was then also seeded with Perlin texture and its shape was dilated by 10 pixels (modeling pixel size is 0.5 nm) with a diffusion at each step. These operations facilitated creating a relatively more realistic shape that avoided contributing to artifacts in the propagation. Radial locations were marked and fractal trees were generated to model spikes at the surface of the viral particle.

Since each element of the model (tissue, viral particles, and spikes) are generated separately, it is possible to mask them and assign polarization components. The viral body was assigned a relatively weak circular polarizability of 5%, and the spikes were assigned a 5% linear polarizability. An average electron density used in the model was 0.3 $e^-/A^3$. The assembled viral particles were then placed in a tissue-free area of the model with a linear gradient of placement probability towards the tissue interface. A simulated scattering experiment was then performed using 495.93 eV X-rays and a propagation distance of 0.7 m. The resultant diffraction patterns showed that even with small amount of polarizability, there is a change in the distribution of the scattered intensities, suggesting that the method can offer sufficient sensitivity to image the viral structures. It may be appreciated that polarimetric CDI can be an effective imaging technique on virus specimens related to diffraction-limited spatial resolution with phase, polarization, and elemental sensitivities.

Polarimetric coherent diffraction imaging, as described herein, can image biological cells and pathogens such as SARS-CoV-2 virus given its non-destructive nature and diffraction-limited spatial resolution with phase (refraction) and polarization sensitivities. Studies on cancerous cells reconstructed by polarimetric CDI illustrate contrasts in the birefringent polarization channel. It is contemplated that the SARS-CoV-2 virus may be studied using polarimetric CDI, as described herein, using, for example, experimental parameters that are implemented in synchrotron facilities and laboratory setups. It is contemplated that pump-probe CDI measurements may be utilized on SARS-CoV-2 viruses, with the ultraviolet (UV) irradiation as the pump and the X-rays as the probe.

Thus, a system and/or method, according to the present disclosure, may be configured to provide an image that corresponds to a map of an anisotropy in a complex refractive index of the biological sample including one or more cellular structure(s). The image may be acquired without relying on chemical labeling.

As used in any embodiment herein, the terms "logic" and/or "module" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may include, for example, singly or in any combination, hard-wired circuitry, programmable circuitry such as computer processors comprising one or more individual instruction processing cores, state machine circuitry, and/or firmware that stores instructions executed by programmable circuitry. The logic and/or module may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

Memory 112 may include one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may include other and/or later-developed types of computer-readable memory.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A method of imaging a biological sample, the method comprising:
    providing, by a polarizing source assembly, a source polarized coherent electromagnetic beam to the biological sample;
    capturing, by a detector assembly, an intermediate electromagnetic beam from the biological sample, the intermediate electromagnetic beam related to the source polarized coherent electromagnetic beam and to an optical anisotropic property of the biological sample;
    providing, by the detector assembly, an output electrical signal corresponding to an output electromagnetic beam, the output electromagnetic beam related to the intermediate electromagnetic beam; and
    generating, by an imaging circuitry, an image of at least a portion of the biological sample based, at least in part, on the output electrical signal, wherein the image corresponds to a map of an anisotropy in a complex refractive index of a cellular structure of the biological sample using coherent diffractive imaging, wherein the output electrical signal corresponds to a plurality of coherent diffraction intensities in which the imaging circuitry is configured to iterate between real-space and reciprocal space to determine a real-space sample complex wave function, with the real-space image being generated without chemical labeling.

2. The method of claim 1, further comprising generating, by an electromagnetic source, a source coherent electromagnetic beam; and
    polarizing, by a polarizer, the source coherent electromagnetic beam to yield the source polarized coherent electromagnetic beam.

3. The method of claim 1, further comprising filtering, by a crystal analyzer, the intermediate electromagnetic beam to yield the output electromagnetic beam; and
    converting, by a detector, the output electromagnetic beam into the output electrical signal.

4. The method of claim 3, wherein a polarization of the crystal analyzer is selected from the group comprising vertical, horizontal, right-hand circular, left-hand circular, and/or elliptical.

5. The method of claim 1, wherein a frequency of the source polarized coherent electromagnetic beam corresponds to visible light or x-ray radiation.

6. The method of claim 1, wherein a wavelength of the source polarized coherent electromagnetic beam is selected based, at least in part, on a characteristic of the biological sample.

7. The method of claim 6, wherein the characteristic of the biological sample corresponds to a range of a dimension of the selected cellular structure.

8. The method of claim 1, wherein the biological sample comprises at least one of a cancerous cell and/or a virus cell.

9. The method of claim 1, wherein a polarization of the source polarized coherent electromagnetic beam is selected from the group comprising vertical, horizontal, right-hand circular, left-hand circular, and/or elliptical.

10. A system for imaging a biological sample, the system comprising:
    a polarizing source assembly configured to provide a source polarized coherent electromagnetic beam to the biological sample;
    a detector assembly configured to capture an intermediate electromagnetic beam from the biological sample, the intermediate electromagnetic beam related to the source polarized coherent electromagnetic beam and to an optical anisotropic property of the biological sample;

the detector assembly further configured to provide an output electrical signal corresponding to an output electromagnetic beam, the output electromagnetic beam related to the intermediate electromagnetic beam; and an imaging circuitry configured to generate an image of at least a portion of the biological sample based, at least in part, on the output electrical signal, wherein the generated image corresponds to a map of an anisotropy in a complex refractive index of a cellular structure of the biological sample using coherent diffractive imaging, wherein the output electrical signal corresponds to a plurality of coherent diffraction intensities in which the imaging circuitry is further configured to iterate between real-space and reciprocal space to determine a real-space sample complex wave function, with the real-space image being generated without chemical labeling.

11. The system of claim 10, wherein the polarizing source assembly comprises an electromagnetic source, and a polarizer, the electromagnetic source configured to generate a source coherent electromagnetic beam, and the polarizer configured to polarize the source coherent electromagnetic beam to yield the source polarized coherent electromagnetic beam.

12. The system of claim 10, wherein the detector assembly comprises a crystal analyzer, and a detector, the crystal analyzer configured to filter the intermediate electromagnetic beam to yield the output electromagnetic beam, and the detector configured to convert the output electromagnetic beam into the output electrical signal.

13. The system of claim 12, wherein a polarization of the crystal analyzer is selected from the group comprising vertical, horizontal, right-hand circular, left-hand circular, and/or elliptical.

14. The system of claim 10, wherein a frequency of the source polarized coherent electromagnetic beam corresponds to visible light or x-ray radiation.

15. The system of claim 10, wherein a wavelength of the source polarized coherent electromagnetic beam is selected based, at least in part, on a characteristic of the biological sample.

16. The system of claim 15, wherein the characteristic of the biological sample corresponds to a range of a dimension of the selected cellular structure.

17. The system of claim 10, wherein the biological sample comprises at least one of a cancerous cell and/or a virus cell.

18. The system of claim 10, wherein a polarization of the source polarized coherent electromagnetic beam is selected from the group comprising vertical, horizontal, right-hand circular, left-hand circular, and/or elliptical.

* * * * *